US011215759B2

(12) United States Patent
Gianesello et al.

(10) Patent No.: US 11,215,759 B2
(45) Date of Patent: Jan. 4, 2022

(54) POLARIZATION-SPLITTING GRANTING COUPLER (PSGC) INTEGRATED OPTOELECTRONIC OR OPTICAL DEVICE

(71) Applicant: STMicroelectronics SA, Montrouge (FR)

(72) Inventors: Frederic Gianesello, Saint Jeoire Prieure (FR); Ophelie Foissey, Champ sur Drac (FR); Cedric Durand, La Terrasse (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 16/889,164

(22) Filed: Jun. 1, 2020

(65) Prior Publication Data
US 2020/0379178 A1 Dec. 3, 2020

(30) Foreign Application Priority Data
Jun. 3, 2019 (FR) ...................... 1905857

(51) Int. Cl.
*G02B 6/27* (2006.01)
*G02B 6/34* (2006.01)

(52) U.S. Cl.
CPC ......... *G02B 6/2773* (2013.01); *G02B 6/2706* (2013.01); *G02B 6/34* (2013.01)

(58) Field of Classification Search
CPC ............................ G02B 6/2773; G02B 6/2706
See application file for complete search history.

(56) References Cited

U.S. PATENT DOCUMENTS

| 7,298,945 B2* | 11/2007 | Gunn, III | G02B 6/30 385/37 |
| 7,397,987 B2* | 7/2008 | Witzens | G02B 6/124 385/14 |
| 10,782,479 B2* | 9/2020 | Bruck | G02B 6/34 |
| 2005/0286832 A1 | 12/2005 | Witzens et al. | |
| 2011/0103743 A1 | 5/2011 | Baets et al. | |
| 2016/0349449 A1* | 12/2016 | Verslegers | G02B 6/34 |

OTHER PUBLICATIONS

Attila Mekis et al: "A Grating Coupler Enabled CMOS Photonics Platform", IEEE Journal of Selected Topics in Quantum Electronics, vol. 17, No. 3, May 1, 2011 pp. 597-608.

(Continued)

*Primary Examiner* — Sung H Pak
(74) *Attorney, Agent, or Firm* — Crowe & Dunlevy (57) ABSTRACT

An integrated optoelectronic or optical device is formed by a polarization-splitting grating coupler including two optical waveguides, a common optical coupler and flared optical transitions between the optical coupler and the optical waveguides. The optical coupler is configured for supporting input/output of optical waves. A first region of the optical coupler lies at a distance from the flared optical transitions. The first region includes a first recessed pattern. Second regions of the optical coupler lie between the first region and the flared optical transitions, respectively, in an adjoining relationship. The second regions include a second recessed pattern different from the first recessed pattern.

28 Claims, 4 Drawing Sheets

(56) References Cited

OTHER PUBLICATIONS

S Pathak et al: "Compact SOI-Based Polarization Diversity Wavelength De-Multiplexer Circuit Using Two Symmetric AWGs", Optics Express, vol. 20, No. 26.
Van Laere F et al: "Focusing Polarization Diversity Gratings for Silicon-on-Insulator Integrated Circuits", Group IV Photonics 2008 5th IEEE International Conference On Piscataway NJ USA, Sep. 17, 2008.
INPI Search Report and Written Opinion for FR Appl. No. 1905857 dated Mar. 6, 2019 (10 pages).

* cited by examiner

POLARIZATION-SPLITTING GRANTING COUPLER (PSGC) INTEGRATED OPTOELECTRONIC OR OPTICAL DEVICE

PRIORITY CLAIM

This application claims the priority benefit of French Application for Patent No. 1905857, filed on Jun. 3, 2019, the content of which is hereby incorporated by reference in its entirety to the maximum extent allowable by law.

TECHNICAL FIELD

The present invention relates to the field of integrated optoelectronic or optical devices and more particularly to the field of polarization-splitting grating couplers (PSGCs).

BACKGROUND

In this field, a polarization-splitting grating coupler (PSGC) integrated optical device is in particular described in U.S. Pat. No. 7,298,945 (incorporated by reference). This device however has unsatisfactory qualities with respect to the transfer of optical waves between a fiber and integrated optical waveguides.

There is a need in the art to improve the optical coupling between such integrated couplers and exterior parts such as optical fibers and to facilitate the fabrication thereof.

SUMMARY

According to one embodiment, an integrated optoelectronic or optical device is provided, said device comprising a substrate wafer in which is produced, on the side of a front face of this substrate wafer, a polarization-splitting grating coupler that comprises two optical waveguides, a common optical coupler and optical transitions that link the optical coupler and one end of the optical waveguides and that are flared on the side of the optical coupler.

The front face of the optical coupler, which face is located on the side of said front face of the wafer, is configured so as to allow the input/output of optical waves and comprises a first region that lies at a distance from the flared optical transitions, and in which is produced a first recessed pattern, and second regions that lie between the first region and respectively the flared optical transitions, and that adjoin, and in which is produced a second recessed pattern different from said first recessed pattern.

It is thus possible to adapt the spatial shape of the amplitude of the optical wave passing through the optical coupler, between the front face of the optical coupler and the optical waveguides.

Said recessed patterns may be configured so as to make an optical wave input through said front face of the optical coupler converge toward the optical transitions, and/or vice versa.

Said recessed patterns may be configured so as to make it so that the shape of the amplitude of an optical wave input through said front face of the optical coupler is preserved until the optical guides, and/or vice versa.

Said recessed patterns may be configured so as to split orthogonal polarizations of a wave input through said front face of the optical coupler, toward respectively the optical waveguides, and/or vice versa.

Said recessed patterns may be configured so that an optical wave input through said front face of the optical coupler, the amplitude of which has a substantially Gaussian shape, induces optical waves in the optical waveguides, the amplitudes of which have substantially Gaussian shapes, and/or optical waves output from the optical waveguides, the amplitudes of which have substantially Gaussian shapes, may induce an optical wave output through said front face of the optical coupler, the amplitude of which has a substantially Gaussian shape. The areas occupied, per unit area, by the recessed patterns may advantageously decrease, in steps and/or with at least one gradient, from a zone of the first region that is far from the intermediate second regions to the junction zones between the first region and the intermediate second regions.

The areas occupied, per unit area, by the recessed patterns in the second regions may decrease, in steps and/or with at least one gradient, from the first region to the junction zones between the intermediate second regions and the flared optical transitions.

The areas occupied, per unit area, by the recessed patterns may decrease, in steps and/or with at least one gradient, from a zone of the first region that is far from the intermediate second regions to the junction zones between the intermediate second regions and the flared optical transitions.

The areas occupied, per unit area, by the recessed patterns may decrease, in steps and/or with at least one gradient, from a zone of the first region that is far from the intermediate second regions to the edges of the first region that are furthest from the intermediate second regions.

The flared optical transitions may advantageously be adiabatic.

Said recessed first pattern may comprise a plurality of holes and said recessed second pattern may comprise a plurality of grooves.

The holes and grooves may be located on segments of ellipses having common foci that are respectively located on the axes of the flared optical transitions.

The holes and the grooves may have respectively opposite faces that lie on segments of ellipses having common foci that are respectively located on the axes of the flared optical transitions.

The widths of the grooves may be smaller than the smallest dimensions of the smallest holes.

The lengths of the grooves may be larger than the largest dimensions of any of the holes.

At least some of the holes and at least some of the grooves may be blind.

The junction zones between the second regions and respectively the flared optical transitions and the junction zones between said first region and respectively the second regions may lie on segments of ellipses the common foci of which are respectively located on the axes of the flared optical transitions.

Said recessed first pattern may comprise a plurality of holes that are located on segments of ellipses having said foci.

Said holes may have opposite faces that lie on segments of ellipses having respectively said foci.

Said recessed second pattern may comprise a plurality of grooves that comprises groups of grooves formed respectively in said second regions, the grooves of each group of grooves lying respectively on segments of ellipses having respectively said foci.

Said grooves may have opposite faces that lie on segments of ellipses having respectively said foci.

The coupler may have an axis of symmetry on either side of which the optical transitions are located.

The flared optical transitions may have orthogonal axes.

The device may comprise an optical fiber one end of which is fastened above said front face of the substrate wafer and is located above the optical coupler.

The axis of the optical fiber may be inclined with respect to said front face of the substrate wafer and the axis of its end may be oriented in the direction of said first region of the front face of the optical coupler.

The coupler and the waveguides may be made of silicon and are enveloped by a material having a refractive index lower than that of silicon, in particular silicon oxide.

BRIEF DESCRIPTION OF THE DRAWINGS

An integrated optoelectronic or optical device will now be described by way of non-limiting example embodiment, illustrated by the drawings, in which.

DETAILED DESCRIPTION

Figure 1:
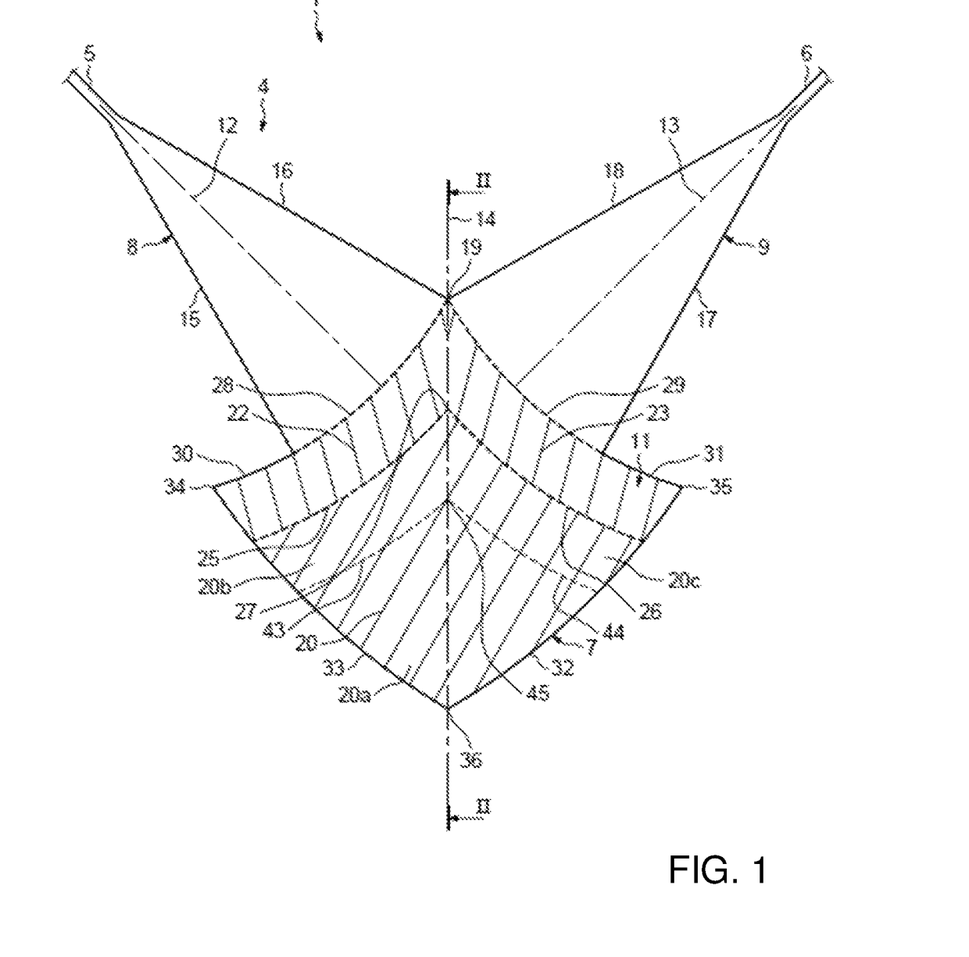
FIG. 1 shows a front view of a coupler of an optoelectronic or optical device.
Figure 2:
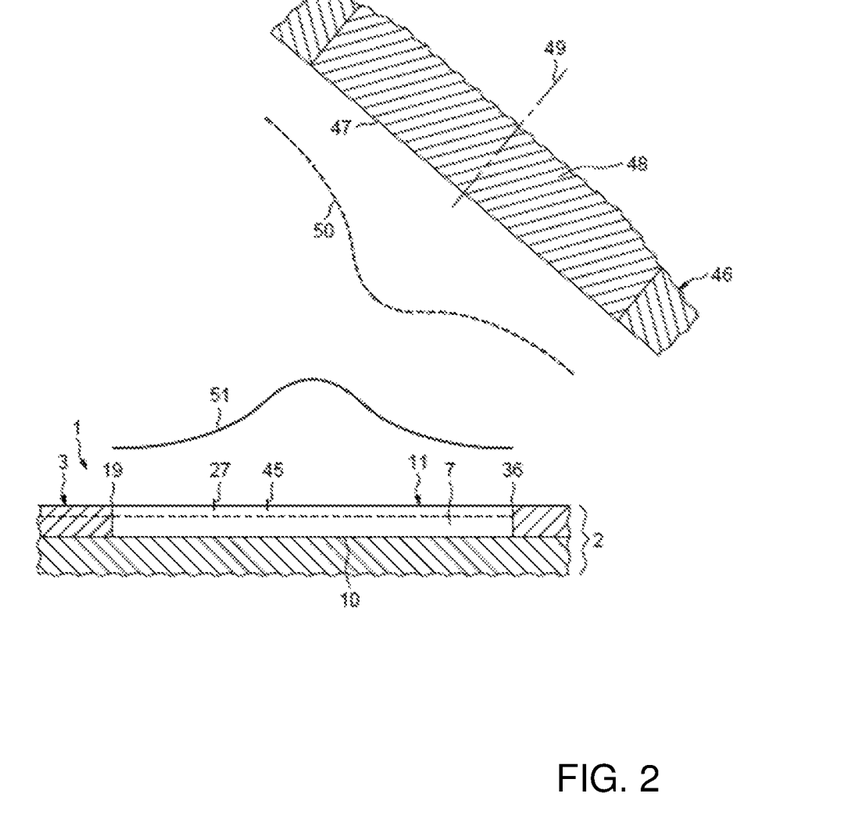
FIG. 2 shows a cross section of the optoelectronic or optical device, cut along II-II in FIG. 1.

As illustrated in FIGS. 1 and 2, an integrated photonic or optical device 1 comprises a substrate wafer 2 in which is produced, on the side of a front face 3 of this wafer 2 and in the form of a local layer, a polarization-splitting grating (PSG) coupler 4.

The optical coupler comprises two optical waveguides 5 and 6, with parallel faces, a common optical coupler 7, which is able to emit/receive optical waves (light beams), and optical transitions 8 and 9 that link the optical coupler 7 and one end of the optical waveguides 5 and 6, respectively. The optical transitions 8 and 9 are each flared in shape transitioning in width from a relatively narrow width at the respective optical waveguides 5 and 6 to a relatively wider width at respective connections to the side of the optical coupler 7.

The other ends of the optical waveguides 5 and 6 are connected to an integrated optoelectronic circuit (not shown) of the substrate wafer 2.

Advantageously, the coupler 4 is formed and lies locally between the front face 11 and a deep face 10 of the substrate wafer 2. The front face 11 and the deep face 10 are parallel.

Advantageously, the coupler 4 and the optical waveguides 5 and 6 are formed by a local silicon layer, produced above a subjacent layer of the substrate wafer 2 having a refractive index lower than that of silicon, for example made of silicon oxide, and are bounded laterally by a layer having a refractive index lower than that of silicon, for example made of silicon oxide or made of glass.

The front face 11 comprises recessed patterns that are configured so as to make an optical wave input through said front face of the optical coupler converge toward the optical transitions, and/or vice versa.

Generally, the PSG coupler 4 is configured to operate in the following way.

An input optical wave coming from outside the substrate wafer 2 passes through a front face 11 of the optical coupler 7, which face is located on the side of the front face 3 of the substrate wafer 2, and which is configured to this end, and is directed toward the optical guides 5 and 6 via the flared optical transitions.

More specifically, the optical wave comprises an optical signal the polarization of which is random, output for example from an optical fiber that does not maintain polarization.

The front face 11 of the optical coupler 7 is configured so as to collect as much as possible of the optical signal by collecting (filtering) two orthogonal polarizations of the optical signal. The split polarizations are directed respectively toward the separate optical waveguides 5 and 6, via respectively the flared optical transitions 8 and 9, which are advantageously adiabatic, in order to be processed by the aforementioned integrated optoelectronic circuit.

The PSG coupler 4 may operate reciprocally in order to couple two optical signals having two orthogonal polarizations output from the aforementioned integrated optoelectronic circuit, so as to form an optical signal output through the front face 11 of the optical coupler, and for example sent to an optical fiber.

The PSG coupler 4 may be configured in the following way.

The flared optical transitions 8 and 9 and the segments adjacent to these flared optical transitions 8 and 9 of the waveguides 5 and 6 have axes or planes of symmetry 12 and 13. Advantageously, the axes of symmetry 12 and 13 are orthogonal.

The flared optical transitions 8 and 9 are formed symmetrically with respect to a general axis or plane of symmetry 14 and on either side of this axis of symmetry 14.

The flared optical transitions 8 and 9 have respectively opposite edges 15, 16 and 17, 18. The edges 16 and 18 of the flared optical transitions 8 and 9, which are located on the side of the general axis of symmetry 14, join on this general axis of symmetry 14 at a point 19.

The front face 11 of the optical coupler 7 comprises a first region 20 that lies at a distance from the flared optical transitions 8 and 9, and in which is produced a first recessed pattern 21 (FIGS. 3 and 4), and intermediate second regions 22 and 23 that lie between the first region 20 and respectively the flared optical transitions 8 and 9, and in which is produced a second recessed pattern 24 (FIGS. 5 and 6) that is different from the first recessed pattern 21. The intermediate second regions 22 and 23 meet on the general axis of symmetry 14.

The junction zones between the first region and the second regions lie respectively on lines 25 and 26. The lines 25 and 26 meet on the general axis of symmetry 14 at a point 27.

The junction zones between the flared optical transitions 8 and 9 and the intermediate second regions 22 and 23 lie respectively on lines 28 and 29. The lines 28 and 29 meet on the general axis of symmetry 14 at the point 19.

The front face 11 of the optical coupler 7 has edges 30 and 31 that extend the lines 28 and 29 beyond the faces 15 and 17 of the flared optical transitions 8 and 9 and has edges 32 and 33, opposite to the flared optical transitions 8 and 9, that meet the edges 30 and 31 at points 34 and 35, and that meet at a point 36 located on the general axis of symmetry 14.

Advantageously, on the one hand the lines 25 and 28 and the edge 32 lie on segments of first ellipses the common foci of which are located on the axis of symmetry 12 of the flared transition 8 and on the other hand the lines 26 and 29 and the edge 33 lie on segments of second ellipses the common foci of which are located on the axis of symmetry 13 of the flared transition 9. The foci of the first ellipses and the foci of the second ellipses are located symmetrically with respect to the general axis of symmetry 14.

Figure 3:
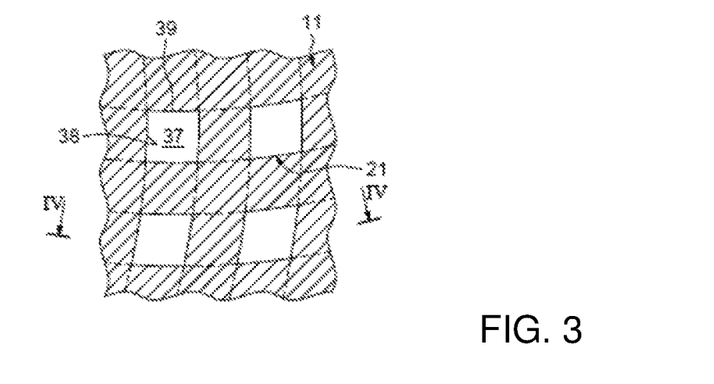
FIG. 3 shows an enlarged local front view of a detail of a coupler of the optoelectronic or optical device.
Figure 4:
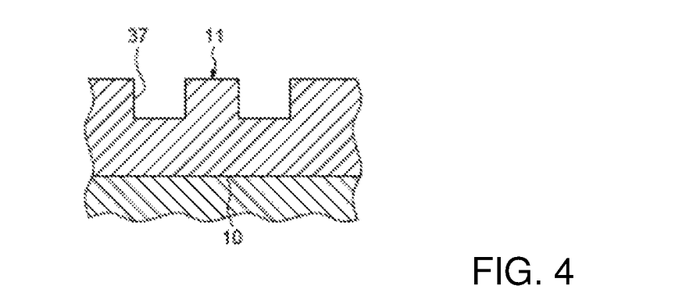
FIG. 4 shows a cross section cut along IV-IV in FIG. 3.

As illustrated in FIGS. 3 and 4, the first recessed pattern 21 comprises a plurality of blind holes 37, which are distant from one another. The holes 37 are configured so as to make the optical wave, i.e. the light beam, converge respectively toward either or both of the flared optical transitions 8 and 9.

Advantageously, the cross sections of the holes 37 are approximately square or close to a square and have opposite faces 38 and opposite faces 39, which respectively lie on first ellipses and second ellipses the foci of which are the aforementioned foci of the aforementioned first and second ellipses, which foci are respectively located on the axes of symmetry 12 and 13.

Thus, the holes 37 are generated by superposing two series of segments of ellipses. The distances between the faces 38 and 39 may be equal.

Figure 5:
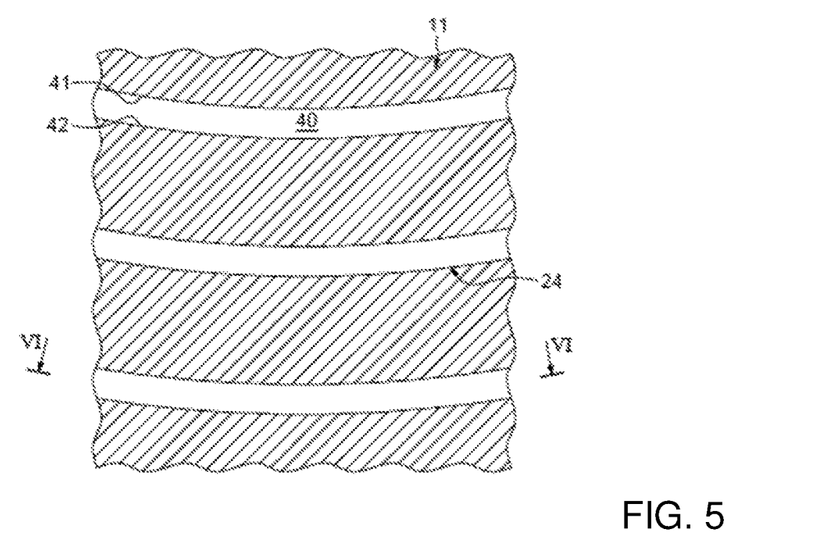
FIG. 5 shows an enlarged local front view of another detail of a coupler of the optoelectronic or optical device.
Figure 6:
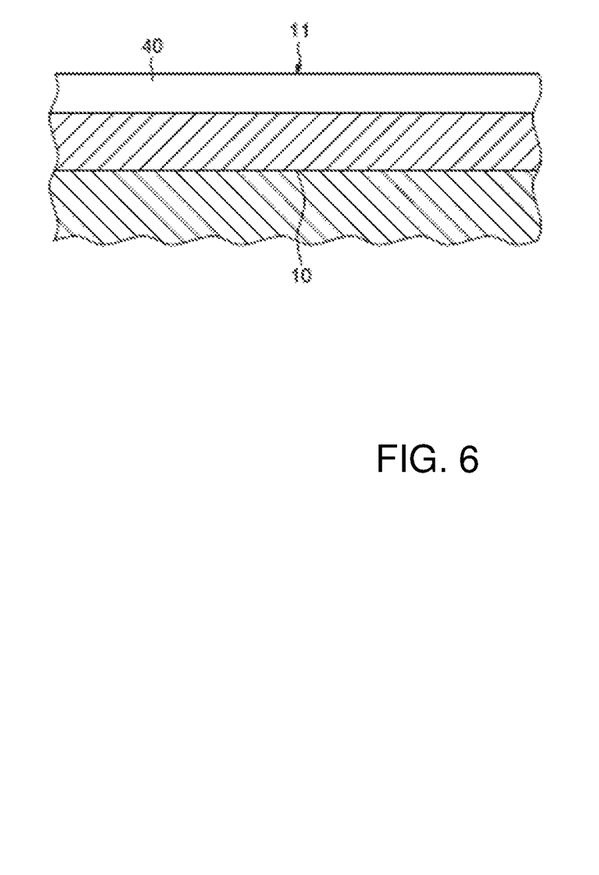
FIG. 6 shows a cross section cut along VI-VI in FIG. 5.

As illustrated in FIGS. 5 and 6, the second recessed pattern 24 comprises a plurality of elongate blind grooves 40, which are distant from one another, respectively formed in the intermediate second regions 22 and 23.

The elongate grooves 40 are configured so as to make the optical wave, i.e. the light beam, output from the optical coupler converge toward either or both of the flared optical transitions 8 and 9.

The elongate grooves 40 have opposite elongate faces 41 and 42.

Advantageously, in the intermediate second region 22, is formed a group of grooves 40 the opposite elongate faces 41 and 42 of which lie on first ellipses the foci of which are the aforementioned foci of the aforementioned first ellipses, which foci are located on the axis of symmetry 12.

These grooves 40 extend from the edge 33 of the optical coupler 7 to the general axis of symmetry 14, between the points 19 and 27, and are continuous or discontinuous.

In the intermediate second region 23, is formed a group of grooves 40 the opposite elongate faces 41 and 42 of which lie on second ellipses the foci of which are the aforementioned foci of the aforementioned second ellipses, which foci are located on the axis of symmetry 13.

These grooves 40 extend from the edge 32 of the optical coupler 7 to the general axis of symmetry 14, between the points 19 and 27, and are continuous or discontinuous.

The holes 37 and the grooves 40 are able to split the two orthogonal polarizations of an input optical wave illuminating the front face of the optical coupler 7, so that the split polarizations are directed respectively toward the separate optical waveguides 5 and 6 via respectively the adiabatic flared optical transitions 8 and 9, and vice versa.

The recessed patterns 21 and 24, formed by the holes 37 and the grooves 40, are filled with a material having a refractive index lower than that of silicon, for example silicon oxide. The front face 3 of the coupler 4 and the waveguides 5 and 6 are covered by a material having a refractive index lower than that of silicon, for example silicon oxide.

Thus, the coupler 4 and the waveguides 5 and 6 are enveloped by a material having a refractive index lower than that of silicon.

Advantageously, the recessed patterns 21 and 24 are configured so that an optical wave input through the front face 11 of the optical coupler 7, the amplitude of which has a substantially Gaussian shape, induces optical waves in the optical waveguides 5 and 6, the amplitudes of which have substantially Gaussian shapes.

Conversely, optical waves output from the optical waveguides 5 and 6, the amplitudes of which have substantially Gaussian shapes, induce an optical wave output through the front face 11 of the optical coupler 7, the amplitude of which has a substantially Gaussian shape.

In a direction of travel of an optical wave through the coupler 4 and/or in the opposite direction, it is therefore a question of preserving a Gaussian shape of the amplitude of this optical wave.

The following particular arrangements may, by way of example, be used.

The areas occupied by the recessed patterns 21 and 24 decrease, in steps and/or with at least one gradient, from a zone of the first region 20 that is far from the intermediate second regions 22 and 23 to the lines 28 and 29 between the second regions 22 and 23 and the flared optical transitions 8 and 9.

As illustrated in FIG. 1, the first region 20 comprises a sub-region 20a that is far from the intermediate second regions 22 and 23 and intermediate sub-regions 20b and 20c that lie between the sub-region 20a and the intermediate second regions 22 and 23 and that meet on the general axis of symmetry 14.

The junction zones between the sub-region 20a and the intermediate sub-regions 20b and 20c lie on lines 43 and 44. The lines 43 and 44 lie on segments of ellipses having the same aforementioned respective foci. The lines 43 and 44 meet at a point 45 of the general axis of symmetry 14.

In the sub-region 20a, the holes 37 have the same dimensions and are generated with constant pitches.

In the sub-regions 20b and 20c, according to one variant embodiment, the holes 37 become, with respect to the holes of the sub-region 20a, increasingly small with distance respectively from the lines 43 and 44 to the lines 25 and 26, in steps and/or with at least one gradient, and are generated with a constant pitch. According to another variant embodiment, the holes 37 have the same dimension and are generated with pitches that become increasingly large with distance respectively from the lines 43 and 44 to the lines 25 and 26, in steps and/or with at least one gradient. These variant embodiments may be combined.

In the intermediate second regions 22 and 23, according to one variant embodiment, the widths of the grooves 40 are increasingly small with distance respectively from the lines 25 and 26 to the lines 28 and 29, in steps and/or with at least one gradient, and are generated with a constant pitch. According to another variant embodiment, the grooves 40 have the same width and are generated with pitches that are increasingly large with distance respectively from the lines 25 and 26 to the lines 28 and 29, in steps and/or with at least one gradient. These variant embodiments may be combined.

The zone adjacent to the corner 36 of the first region 20 may also comprise holes 37 that, with respect to the largest holes of this region, are increasingly small with decreasing distance to this corner 36, in steps and/or with at least one gradient, and may be generated with a constant pitch.

According to another variant embodiment, in this zone, the holes 37 have the same dimension and are generated with pitches that are increasingly large with decreasing distance to the corner 36, in steps and/or with at least one gradient. These variant embodiments may be combined.

Advantageously, the widths of the grooves 40 are smaller than the smallest dimensions of the smallest holes 37.

The lengths of the grooves 40 are larger than the largest dimensions of any of the holes.

The holes 37 and the grooves 40 are produced by partial etching of the thickness of the optical coupler 7, using an etching process commonly used in microelectronics. Advantageously, the grooves 40 may be produced even if their width is small.

As illustrated in FIG. 1, the integrated photonic or optical device 1 comprises an optical fiber 46 an end segment of which is fastened above the front face 3 of the substrate wafer 2, for example by way of a transparent adhesive (not shown), in a position such that its end face 47 is located facing and at a distance from the front face 3 of the substrate wafer 2.

The optical fiber 46 comprises a core 48 forming an optical guide the longitudinal axis 49 of which is located in a plane perpendicular to the front face 3 of the substrate wafer 2 and passing through the general axis of symmetry 14 of the coupler 4.

In this plane, the longitudinal axis 49 is inclined by 8 degrees with respect to the normal to the front face 3 of the substrate wafer 2 and targets the front face 11 of the optical coupler 7, and more particularly the first region 20, and advantageously a zone of the sub-region 20a close to the point 45.

Thus, an optical wave output from the core 48 of the optical fiber 46 is emitted in the direction of the front face 11 of the optical coupler 7 and forms an input wave that penetrates into the optical coupler 7 in order to be split, in the latter, toward the optical guides 5 and 6 and vice versa, as described above.

On account of the arrangements described above with respect to the recessed patterns 21 and 24, a Gaussian shape 50 (FIG. 2) of the amplitude of an optical wave emitted at the end of the core 48 of the optical fiber 46 is preserved through the coupler 4 and reaches the optical guides 5 and 6.

In the opposite direction, a Gaussian shape 51 (FIG. 2) of the amplitude of an optical wave emitted by the optical coupler 7 via its front face 11 reaches the end face of the core 48 of the optical fiber 46.

The optical fiber 46 could be replaced by another optoelectronic or optical device mounted above the front face 3 of the optoelectronic or optical device 1.

The following is one possible example embodiment.

The thickness of the layer in which the coupler 4 is produced may be about three hundred nanometers.

The width of the optical waveguides 5 and 6 may be about three hundred/four hundred nanometers.

The opposite sides of the optical coupler 7 may be at distances of about twenty microns.

The width of the optical transitions 8 and 9, at their ends adjacent to the optical coupler 7, may be about eleven microns.

The opening angles of the optical transitions 8 and 9 may be about twenty-eight degrees.

The opposite sides of the largest holes 37 may be at a distance of two hundred and fifty nanometers and be generated with a pitch of five hundred nanometers. The smallest holes 37 may have a width of about one hundred and eighty nanometers and a length of about two hundred and forty nanometers and be generated with a pitch of five hundred nanometers.

The grooves 40 may have widths ranging from one hundred and sixty to sixty nanometers and may be generated with a pitch of four hundred nanometers.

The holes 37 and the grooves 40 may have depths of about one hundred and forty nanometers.

The invention claimed is:

1. An integrated optoelectronic or optical device, comprising:
   a substrate wafer; and
   a polarization-splitting grating coupler on a side of a front face of the substrate wafer, wherein the polarization-splitting grating coupler comprises:
   two optical waveguides;
   a common optical coupler; and
   optical transitions that respectively link the common optical coupler and one end of each of the two optical waveguides, wherein each optical transition is flared on the side of the common optical coupler;
   wherein a front face of the common optical coupler located on the side of said front face of the substrate wafer is configured for input/output of optical waves and comprises:
   a first region that lies at a distance from the flared optical transitions, and in which is produced a first recessed pattern; and
   second regions that lie between the first region and the flared optical transitions, respectively, and that adjoin and in which is produced a second recessed pattern different from said first recessed pattern.

2. The device according to claim 1, wherein said first and second recessed patterns are configured to converge an optical wave input through said front face of the common optical coupler toward the flared optical transitions, and/or vice versa.

3. The device according to claim 1, wherein said first and second recessed patterns are configured to preserve a shape of an amplitude of an optical wave input through said front face of the common optical coupler until the two optical waveguides, and/or vice versa.

4. The device according to claim 1, wherein said first and second recessed patterns are configured to split orthogonal polarizations of a wave input through said front face of the common optical coupler toward the two optical waveguides, respectively, and/or vice versa.

5. The device according to claim 1, wherein said first and second recessed patterns are configured to induce optical waves in the two optical waveguides in response to an optical wave input through said front face of the common optical coupler, where an amplitude of the optical wave input has a substantially Gaussian shape, and where amplitudes of the induced optical waves in the two optical waveguides have substantially Gaussian shapes.

6. The device according to claim 1, wherein said first and second recessed patterns are configured to induce an optical wave output through said front face of the common optical coupler in response to optical waves output from the two optical waveguides, wherein amplitudes of optical waves output have substantially Gaussian shapes, and where an amplitude of the induced optical wave output has a substantially Gaussian shape.

7. The device according to claim 1, wherein areas occupied, per unit area, by the first and second recessed patterns decrease, in steps and/or with at least one gradient, from a zone of a first region that is further from intermediate second regions to junction zones between the first region and the intermediate second regions.

8. The device according to claim 7, wherein areas occupied, per unit area, by the first and second recessed patterns in the intermediate second regions decrease, in steps and/or with at least one gradient, from the first region to the junction zones between the intermediate second regions and the flared optical transitions.

9. The device according to claim 1, wherein areas occupied, per unit area, by the first and second recessed patterns decrease, in steps and/or with at least one gradient, from a zone of a first region that is further from intermediate second regions to junction zones between the intermediate second regions and the flared optical transitions.

10. The device according to claim 1, wherein areas occupied, per unit area, by the first and second recessed patterns decrease, in steps and/or with at least one gradient, from a zone of a first region that is further from intermediate second regions to edges of the first region that are furthest from the intermediate second regions.

11. The device according to claim 1, wherein the flared optical transitions are adiabatic.

12. The device according to claim 1, wherein said first recessed pattern comprises a plurality of holes and said second recessed pattern comprises a plurality of grooves.

13. The device according to claim 12, wherein the holes and grooves are located on segments of ellipses having common foci that are respectively located on axes of the flared optical transitions.

14. The device according to claim 12, wherein the holes and the grooves have respectively opposite faces that lie on segments of ellipses having common foci that are respectively located on axes of the flared optical transitions.

15. The device according to claim 12, wherein widths of the grooves are smaller than a smallest dimension of a smallest of said holes.

16. The device according to claim 12, wherein lengths of the grooves are larger than a largest dimension of any of said holes.

17. The device according to claim 12, wherein at least some of the holes and at least some of the grooves are blind.

18. The device according to claim 1, wherein junction zones between second regions and the flared optical transitions respectively and wherein junction zones between each first region and each second region, respectively, lie on segments of ellipses the common foci of which are respectively located on axes of the flared optical transitions.

19. The device according to claim 18, wherein said first recessed pattern comprises a plurality of holes that are located on segments of ellipses having said foci.

20. The device according to claim 19, wherein said holes have opposite faces that lie on segments of ellipses having respectively said foci.

21. The device according to claim 18, wherein said second recessed pattern comprises a plurality of grooves that include groups of grooves formed respectively in second regions, the grooves of each group of grooves lying respectively on segments of ellipses having respectively said foci.

22. The device according to claim 21, wherein said grooves have opposite faces that lie on segments of ellipses having respectively said foci.

23. The device according to claim 1, wherein the common optical coupler has an axis of symmetry, and wherein the optical transitions are located on either side of the axis of symmetry.

24. The device according to claim 1, wherein the optical transitions have orthogonal axes.

25. The device according to claim 1, further comprising an optical fiber having one end positioned above said front face of the substrate wafer, and which is located above the common optical coupler.

26. The device according to claim 25, wherein an axis of the optical fiber is inclined with respect to said front face of the substrate wafer and oriented in a direction towards said first region of the front face of the common optical coupler.

27. The device according to claim 1, wherein the common optical coupler and the two optical waveguides are made of silicon and are enveloped by a material having a refractive index lower than that of silicon.

28. The device according to claim 27, wherein the material is silicon oxide.

* * * * *